A. ALVAREZ AND B. F. MARSHALL.
HEATER.
APPLICATION FILED APR. 13, 1917.
1,365,074.
Patented Jan. 11, 1921.
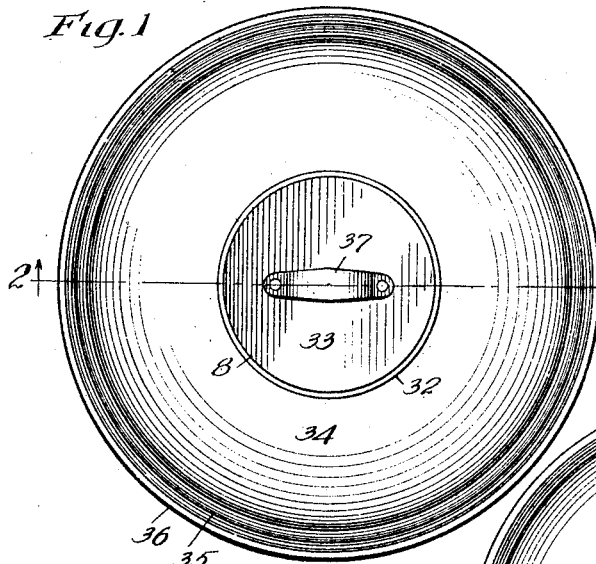
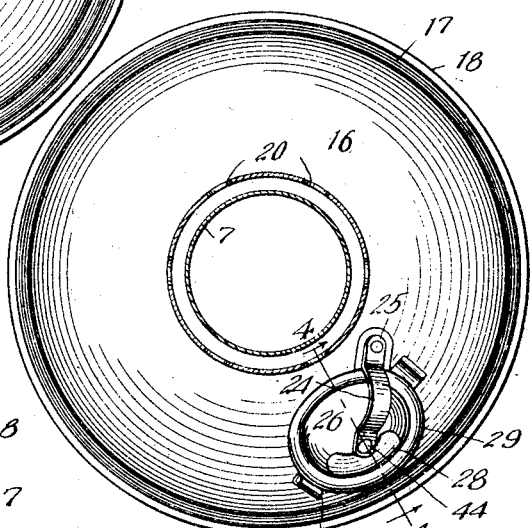
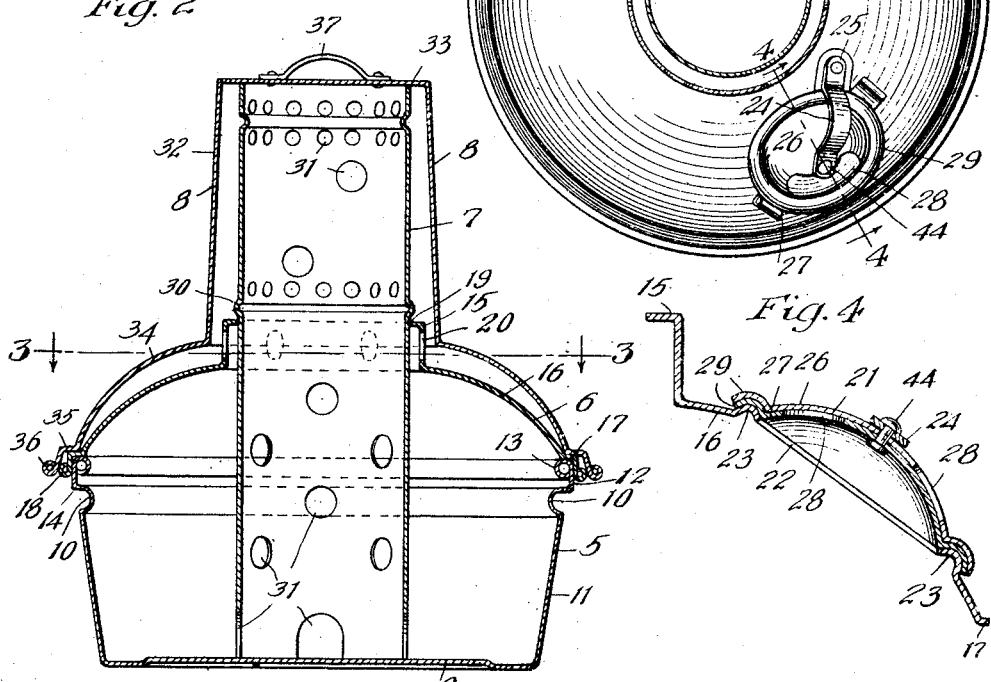
Witnesses:
Wm. Geiger
Thos. J. O'Brien
Inventors
Antonio Alvarez,
B. F. Marshall
By Munday, Evarts, Adcock & Clarke Attys.

UNITED STATES PATENT OFFICE.

ANTONIO ALVAREZ AND BENJAMIN F. MARSHALL, OF SAN FRANCISCO, CALIFORNIA, ASSIGNORS TO AMERICAN CAN COMPANY, OF NEW YORK, N. Y., A CORPORATION OF NEW JERSEY.

HEATER.

1,365,074.  Specification of Letters Patent.  Patented Jan. 11, 1921.

Application filed April 13, 1917. Serial No. 161,802.

*To all whom it may concern:*

Be it known that we, ANTONIO ALVAREZ and BENJAMIN F. MARSHALL, citizens of the United States, residing in San Francisco, in the county of San Francisco and State of California, have invented a new and useful Improvement in Heaters, of which the following is a specification.

This invention relates in general to heaters and more particularly to heaters provided for use in orchards and the like.

The principal object of the invention is the provision of an orchard heater of simple, durable and efficient construction, the parts of which may be cheaply manufactured, compactly packed for shipment, easily and quickly assembled for use and readily charged with fuel and ignited.

A further object of the invention is the provision of a heater of the qualities enumerated in which the combustion of the fuel may be perfectly controlled and the heater moved about from place to place as occasion may require without extinguishing the fire.

A still further object of the invention is the provision of a heater of the character described, which will be waterproof when the parts are assembled.

Other objects and advantages of the invention will be apparent as it is better understood from the following description when considered in connection with the accompanying drawings illustrating a preferred embodiment thereof.

In the accompanying drawing which forms a part of this specification, Figure 1 is a top plan view of a heater embodying our invention when the parts of the same are assembled and the heater is not in use. Fig. 2 is a vertical section taken substantially on the line 2—2 of Fig. 1; Fig. 3 is a horizontal section taken substantially on the line 3—3 of Fig. 2, the hood having been removed, and Fig. 4 is an enlarged sectional view taken substantially on the line 4—4 of Fig. 3.

For the purpose of illustrating our invention, we have shown it embodied in an orchard heater shown on the drawing and consisting of a fuel pan or bowl 5, a cover 6 for this pan or bowl, a vertically disposed draft chimney 7 and a combined hood and closure 8. In the present instance all of the parts are formed of sheet metal of appropriate qualities.

The fuel pan or bowl 5 in the present instance, is of frusto conical shape throughout the greater part of its height and is closed at its bottom by a bottom wall 9. This pan or bowl is preferably seamless and is bent or deflected inwardly to provide an inverted bead 10 adjacent the upper edge of the pan. From the bottom 9 to the inverted bead 10, the side walls 11 are frusto conical in shape. Above the inverted bead 10 the portion 12 is substantially cylindrical and terminates at its upper edge in an inwardly extending false wire or bead 13 which serves to stiffen the upper edge of the pan. The portion 12 is extended or offset outwardly to provide a shoulder 14 adapted to be gripped by an operator, as will be later explained more in detail to move the heater from place to place during its operation.

The cover 6 consists of a central cylindrical portion 15 and an outwardly and downwardly flaring portion 16 which terminates in a right angle flange 17 adapted to engage the upper part of the portion 12 to hold the cover in place. The lower edge of the angle portion 17 is turned back upon itself to provide an outwardly extending bead or false wire edge 18. The cylindrical portion is provided with a large central opening 19 through which the chimney 7 extends and has apertures 20, extending through its vertical wall for the admission of the air of combustion. The vertical wall of the cylindrical portion is located relatively close to the vertical wall of the chimney 7 and the apertures 20 serve in a measure to control the rapidity of combustion and hold it to a predetermined rate. Additional control is provided by a two-part damper 21 fitting over an aperture 22 provided in the flaring portion 16 of the cover 6. About the aperture 22 is an outwardly extending bead 23 adapted to be engaged by the damper 21 when the parts are in one position. The damper 21 is pivotally connected at its center to a leaf spring 24 which is pivotally connected at 25 on the cover. Both parts of the damper may be swung about the pivot 25 of the spring to expose the complete opening 22 to the outside air. Less air, however, may be admitted through this damper by turning the two parts 26 and 27 about the pivot 44. Each part is provided with one or more openings 28 which are adapted to register for the purpose of governing the air delivered to the fuel pan. Both the parts 26 and 27 are provided with beads 29 adapted to engage one over the other and over the bead 23 extending about the aperture 22 where they will be held in place by the spring member 24.

The vertically disposed chimney 7 is substantially cylindrical, which may, however, taper slightly at its lower end. This taper is only sufficient to permit a plurality of chimneys to be nested during shipment and an outwardly extending bead or portion 30, is provided to prevent the chimneys sticking one to the other when it is desired to separate them and assemble the several heaters to which they belong. The outwardly extended portion or bead 30 is located a sufficient distance above the lower end of the chimney to permit the chimney to rest flat on the bottom of the fuel pan. Numerous and appropriately spaced apertures 31 are provided to permit the fuel and air to enter the chimney during use.

In order that it will be not necessary to remove the heaters from the orchard or other location during rain, sleet and the like, we provide the combined hood and cover 8 for the entire device. This consists of an upwardly extending substantially cylindrical portion 32 which may taper slightly upwardly, sufficiently for the nesting of several covers together, and is closed at its top by a top wall 33 and having a downwardly and outwardly flaring portion or base 34 formed at its lower edge with an annular flange 35 adapted to fit over the annular flange 17 and bead 18 of the cover, said flange 35 terminating in a reinforcing bead 36. The portion 32 is of sufficient length to permit the top wall 33 to rest upon the top of the chimney 7 so that if it is desired to move the heater while the combined hood and closure is in place on the heater, the chimney will be firmly held in position. A suitable handle 37 is provided for removing the combined hood and closure.

It will be manifest that the device consists of few and simple parts, easily packed and easily assembled. All of the parts may be nested with similar parts of other heaters and to this end the upper portion of the combined hood and closure is not accurately cylindrical but is tapered slightly, as shown, to permit it to telescope with analogous parts of other heaters. After being assembled it is only necessary to pour an appropriate fuel into the heater and light it in the usual manner. The heater may be moved without removing the fuel while it is burning and even when the combined hood and closure is in place, by merely engaging the ends of the fingers beneath the shoulder 14 and carrying it about. The arrangement of the false wire edges or beads on the hood, cover and pan provide an extremely strong and durable connection between the parts when they are interengaged and the cylindrical bead 10 co-acting with the right angle flanges 17 and 35 adds materially to this strength.

It is believed that the invention and many of its attendant advantages will be understood from the foregoing without further description and it will be obvious that various changes may be made in the improvement, construction and arrangement of the parts described, without departing from the spirit and scope of the invention or sacrificing any of its material advantages, the form disclosed being merely a preferred embodiment thereof.

We claim:

1. An orchard heater comprising a fuel pan, a draft chimney resting on the bottom of said pan and extending above the same, a cover fitting the edge of said pan and having an upwardly extending neck having at its upper end a removable air-tight engagement around said chimney, and a hood removably fitting over the top of the chimney and extending downward to near said cover and extending outward and seated on the edge of said cover, said upwardly extending neck being provided with perforations opening to the interior of the fuel pan, said perforations being open to the atmosphere when the hood is removed and being inclosable by said hood.

2. An orchard heater comprising a fuel pan, a cover therefor fitting on the edge of the pan and having an upwardly extending neck and an inwardly extending flange, and a perforated draft chimney seated on the bottom of the pan and removably fitting within said flange of the cover, said neck of the cover being formed with perforations opening from the atmosphere to the interior of the fuel pan.

3. An orchard heater comprising a fuel pan, a cover therefor having an upwardly extending neck formed with an inwardly extending flange and with perforations 20 below said flange, and a draft chimney fitting within said flange, extending down into the pan and having air and fuel perforations below said flange.

4. An orchard heater comprising a fuel pan, a cover therefor removably fitting on the edge of said pan, and a central upwardly extending draft chimney and a hood having a central substantially cylindrical portion inclosing the upper part of said chimney and having a lower outwardly extending portion which incloses the cover and removably fits on the margin of the same.

Signed this 3rd day of April, 1917, in the presence of two subscribing witnesses.

ANTONIO ALVAREZ.
B. F. MARSHALL.

Witnesses:
 MARIE FORMAN,
 ALICE TWOHIG.